United States Patent [19]

Cartoni

[11] Patent Number: 5,389,972
[45] Date of Patent: Feb. 14, 1995

[54] SUPPORT HEAD FOR TELEVISION OR MOTION-PICTURE CAMERAS FOR HORIZONTAL AND AZIMUTHAL PANNING SHOTS, HAVING A DAMPING MEMBER AND A BALANCING MEMBER OF VARIABLE INTENSITY

[75] Inventor: Guido Cartoni, Rome, Italy

[73] Assignee: Sachtler Aktiengesellschaft-Kommunikationstechnik, Untersch Leissheim, Germany

[21] Appl. No.: 22,537

[22] Filed: Feb. 25, 1993

[30] Foreign Application Priority Data

Feb. 28, 1992 [IT] Italy ............... RM.92 A/000130

[51] Int. Cl.$^6$ .................. H04N 5/225; H04N 5/232
[52] U.S. Cl. .................. 348/373; 354/293; 352/243; 248/183
[58] Field of Search ............ 348/373, 375, 214, 219; 354/81, 82, 293; 352/243; 248/183; H04N 5/222, 5/225

[56] References Cited

U.S. PATENT DOCUMENTS

| | | | |
|---|---|---|---|
| 1,238,447 | 8/1917 | Severey | 192/58 C |
| 3,362,510 | 1/1968 | Nash | 188/290 |
| 4,226,303 | 10/1980 | Thoma | 354/293 X |
| 4,771,979 | 9/1988 | Nakazawa et al. | 354/293 X |
| 4,955,568 | 9/1990 | O'Connor et al. | 248/183 |

Primary Examiner—Joseph Mancuso
Assistant Examiner—Wendy R. Greening
Attorney, Agent, or Firm—Pollock, Vande Sande & Priddy

[57] ABSTRACT

A support head for television or motion-picture cameras able to allow horizontal and azimuthal panning shots, is made up of balancing member and device of control and adjustment of both horizontal and azimuthal movements. The device for the control and adjustment of azimuthal and horizontal movements includes a braking element and a braked element, assembled on the same axis and each made up of a series of facing annular surfaces. The annular surfaces of the braking system engage in the spaces between adjacent facing surfaces of the braking element. A high viscosity fluid is arranged between the facing surfaces of the braking and braked elements. The device for actuating the braking element for adjustment of azimuthal movement is made up of a screw control arranged inside the support head, rotating inside a hollow shaft element slidable in a longitudinal direction and having slot ports on its outer surface.

6 Claims, 3 Drawing Sheets

SUPPORT HEAD FOR TELEVISION OR MOTION-PICTURE CAMERAS FOR HORIZONTAL AND AZIMUTHAL PANNING SHOTS, HAVING A DAMPING MEMBER AND A BALANCING MEMBER OF VARIABLE INTENSITY

FIELD OF THE INVENTION

The present invention relates to a support head for television or motion-picture cameras for horizontal and azimuthal panning shots, having a damping member and a balancing member of variable intensity.

More particularly, the invention relates to a support for television or motion-picture cameras which enables panning shots in both the horizontal plane and the azimuthal plane without any vibration and discontinuity, and it comprises a variable balancing and power member for counterbalancing loads during the panning shot or shooting on the azimuthal plane nd a variable power device for adjustment of the intensity of resistance against rotation.

BACKGROUND OF THE INVENTION

In motion-picture and television cameras, the horizontal and-azimuthal panning shooting movements are separately controlled, and a double braking system is therefore necessary.

In fact, within the scope of technologies already known from prior art, fluid operated heads are known which, for their braking force, use the braking effect of a high viscosity fluid.

These include two kinds of devices, the first of which utilizes the force that is produced between two surfaces, in particular coaxial cylinders, which rotate with respect to each other.

Such a solution, though excluding any possibility of friction, does not allow adjustment of the magnitude of the braking force.

The second kind of device utilizes as its braking system the principle of two surfaces which move with respect to each other with an interposed high viscosity fluid, but also exploits the compression of the fluid and the friction between the rotor and the stator to vary resistance.

Moreover, jaw systems are known of the kind used for the brakes of motorcycles, operating in a tight seal box in a viscous fluid bath.

In such devices, by increasing the pressure of the jaws on the drum, an increase of the resistance to motion is achieved. The main drawback of such a system is that, since the fluid effect and the friction effect are combined, the system undergoes considerable variations as regards its efficiency according to temperature, wear and force applied by the arm of the operator.

A further solution adopted by other manufacturers to obtain such a braking effect makes use of a steel tape on a drum. By pulling the tape by a side, one obtains a variable pressure on the drum and therefore a variation of resistance.

In both systems, the surfaces of the jaws and of the tape are coated with a cork layer, the wrinkled surface whereof delays the lateral expulsion of the fluid subject to pressure.

The main disadvantages of such devices reside in the fact that when the cameraman repeats a panning motion several times in rapid succession, the pressure produced on the fluid veil by the jaws or by the tape produces an expulsion of the fluid, causing the braking effect to decrease during the operation, and thereby compromising in an absolute manner the quality of the shots and rendering duplication practically impossible.

Finally, there are support heads in which the braking force is provided by series arranged modular members in a high viscosity grease bath. The braking effect in various gradations is obtained as a consequence of the engagement or disengagement of the modules. Such a system, acting in absolute absence of friction, ensures continuity, the absence of vibrations and the graduality of motion required in professional shootings, but does not allow the magnitude of the braking force to be changed simultaneously with the panning shot itself, since the engagement of a different number of modules would produce a jump in the shooting.

It turns out to be essential to have a support head of motion picture or television cameras that overcomes the drawbacks of the aforementioned technologies and allows control of horizontal and azimuthal panning shot movements, in absolute absence of friction, adjustable from a minimum to a maximum and repeatable according to the requirements of the operator, as well as simultaneous control of the balancing of the head itself, in absolute absence of vibrations, with graduality and also without any friction during operation.

SUMMARY OF THE INVENTION

To satisfy all of these requirements, the present invention provides for the insertion in a support head for motion-picture or television cameras of two distinct braking systems, one for adjustment of the movement of the azimuthal panning shot and the other for adjustment of the horizontal panning shot, and a system for counterbalancing the television camera itself. The systems for controlling the movement of panning shots use the concept of resistance to motion that is produced when two surfaces move with respect to each other with an interposed high viscosity fluid, and therefore in absolute absence of friction. The braking elements each comprise two facing surfaces which can interpenetrate without touching each other, mounted on the same axis, and which, moving in fluid contact by virtue of an operator controlled drive system, allow the desired resistances to be precisely adjusted.

In particular, according to the present invention it is suggested that, through the adjustment of the interfaced surfaces, the panning shot movements can pass from the value "0" to the value of the desired angular velocity in a gradual manner and return from this value to the value zero during operation too, without the perception of jumps or discontinuities of any kind during the shot.

Moreover, again according to the present invention, it is suggested to endow the support head with two independent control systems for the two movements so as to be able to compose them according to the requirements of the operator, without interference in the control systems.

The system according to the present invention, by providing the two modular members with interfacing surfaces able to interengage and having an interposed silicone oil layer inserted in a closed system in which the fluid is not compressed, achieves an absence of friction in which the reciprocal movement of the two members takes place on the same axis.

In the absence of friction the starts and stops of the stroke of the two members of the braking system will correspond to an initial and final value of the braking force equal to zero, while, in the presence of friction the starts and stops of the angular shifts will no longer coincide with zero, since the initial application of a force of intensity X is necessary to nullify the initial resistance to motion due to friction, a force which represents an unacceptable shortcoming in prior art systems, since it compromises the quality of the shots. This shortcoming is overcome by the present invention.

The present invention provides, besides the system for producing an controlling the braking force for the movements of horizontal and azimuthal panning shots, a system for control of the balancing of the weight of the camera arranged on the support head itself. In fact, as a consequence of the azimuthal movements imparted to it for carrying out azimuthal panning shots, the weight of the camera interferes with the motion and therefore must be nullified by an equal and opposite force.

Several kinds of counterbalancing control systems are known in the prior art, including a first group made up of modular devices comprising a set of reaction springs which intervene singularly or in different combinations depending on the force to be counterbalanced.

The shortcoming of such systems is that they can produce only a limited number of values of balancing forces that do not always succeed in adapting themselves to all the configurations of television or motion-picture cameras.

A second set of known balancing systems uses spiral springs that are compressed or tightened to obtain the desired force level.

However, such a system also has a rather limited range of adaptation.

It is clearly desirable for the fluid-controlled support head of a counterbalancing system to give the operator the feeling of carrying out movements in the azimuthal plane in the absolute absence of the weight of the shooting means, and only controlled by the fluid effect produced by the braking elements mentioned above. Therefore, the forward or rearward movement of the center of gravity of the camera must be perfectly balanced.

However, by changing the weight of the camera according to the fittings that can be assembled on it for various shooting conditions, the present invention provides a variable power system which offers a turnover moment equal and opposite to that determined by the forward or rearward displacement of the television or motion-picture camera.

In order to obtain such an effect, it is suggested, according to the present invention, to prearrange a variable power device comprising an elastic member and an eccentric able to achieve the required value of the intensity of the turnover moment by acting on and controlling the reaction elastic body, not directly, but by causing the member in contact with the elastic body upon a bearing assembled eccentrically on the horizontal axis of the support head to shift in a horizontal direction.

In this way, a device is obtained which produces a wide range of values of the turnover moment, able to balance the moments produced by the displacement of the center of gravity of machines of different weights, an infinitesimal and progressive adjustment able to provide the desired value in a gradual rather than a stepped manner and, moreover, graduated so as to enter and reproduce the desired counterbalancing values.

It is therefore an object of the present invention to provide a support head for television or motion-picture cameras able to allow panning shots in the horizontal and azimuthal planes, comprising a counterbalancing member and devices for controlling and adjusting the horizontal and azimuthal movements, in which the device for controlling and adjusting the azimuthal movement comprises a braking element and a braked element, the braking and braked element being assembled on the same axis and each being made up of a series of faced annular surfaces, in which the annular faces of the braking element engage in the spaces provided between the adjacent facing surfaces of the braking element. A high viscosity fluid contained in a tight seal space inside the support head is arranged between the facing surfaces of the braked and braking elements, the tight seal space having O-ring seal elements in correspondence with the device for driving the braking element and with the ledge of the braked element. The device for driving the braking element is made up of screw control means, arranged outside the support head, rotating inside a longitudinally slidable hollow shaft element which has slot ports in its outer surfaces. First radial pin means slide axially in the slot ports engaging with the outer surface of the braking elements. The adjustment means for the interengagement of the braking and braked element for control of the horizontal movement are made up of second slidable pin means in correspondence with grooves provided on the drive ring nut. The support head comprises a balancing member consisting of bearing means assembled on the eccentric section of the horizontal axis of the support head, elastic means, and hinged contact means between the elastic means and the bearing means. The elastic means are assembled on support member slidable in longitudinal direction and comprising means for controlling and putting the displacement into motion.

The elastic member of the balancing member is made up of steel springs or of a hard rubber or silicone block.

The slidable support member that supports the hinged contact means is adjusted, through the means for controlling and putting the displacement into motion, by screw means arranged on the outer portion of the support head so as to provide variable values of the balancing force.

The pin means are arranged at 120° with respect to the slidable hollow element.

BRIEF DESCRIPTION OF THE DRAWINGS

The invention will now be described by way of example with reference to the annexed drawings, wherein.

DETAILED DESCRIPTION

Figure 1:
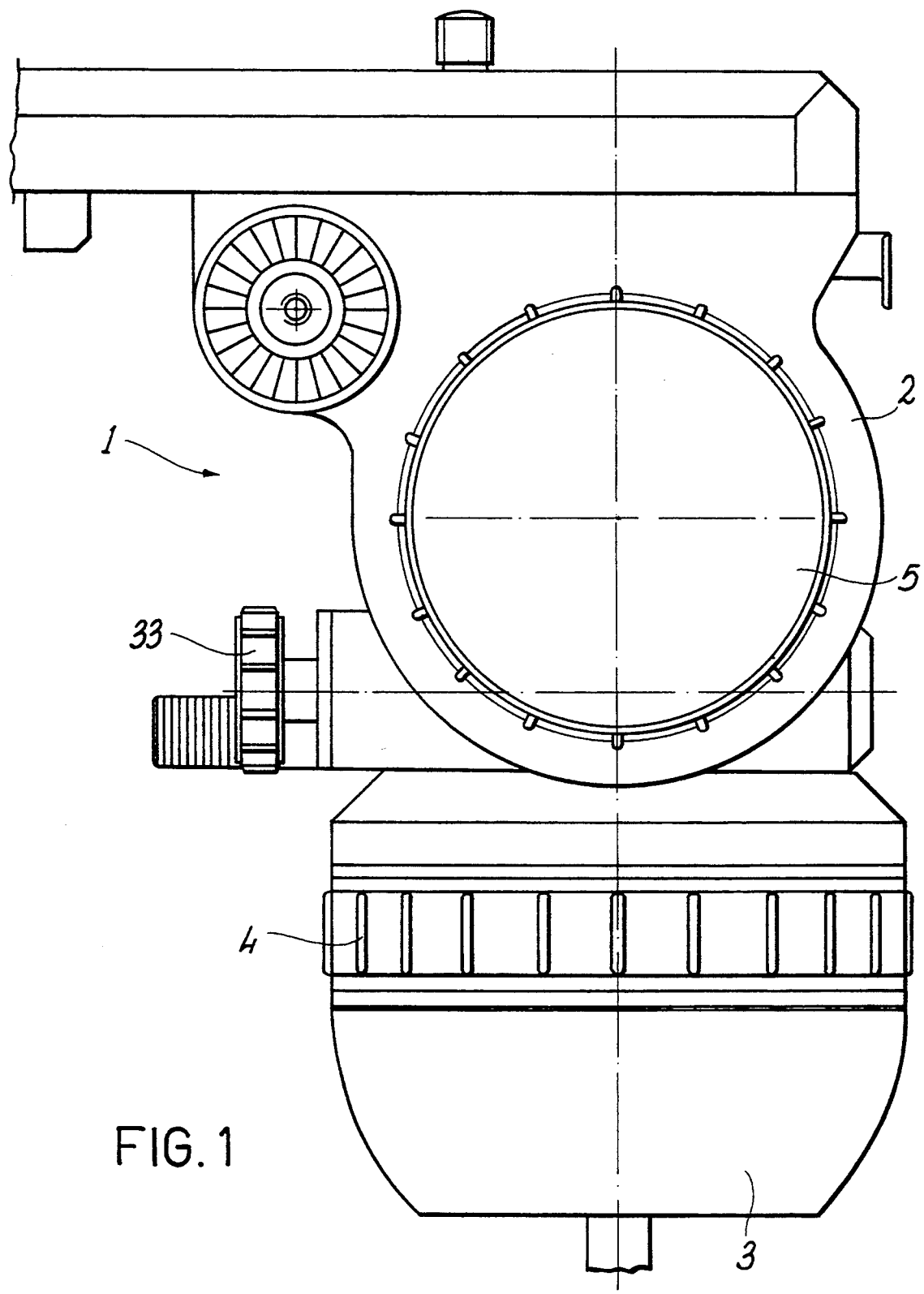
FIG. 1 is a front view of a support head for motion-picture or television cameras according to the present invention.

FIG. 1 shows a support head 1 comprising two connected portions 2 and 3, the first portion being intended to carry out vertical or azimuthal movements and the second portion being intended to carry out horizontal movements.

As regards control and adjustment of panning shot movements, ring 4 is intended to produce the vertical interengagement of the braked and braking element of the mechanism intended to adjust horizontal movement, while the handle 5 controls the two members that adjust vertical movement.

Figure 2:
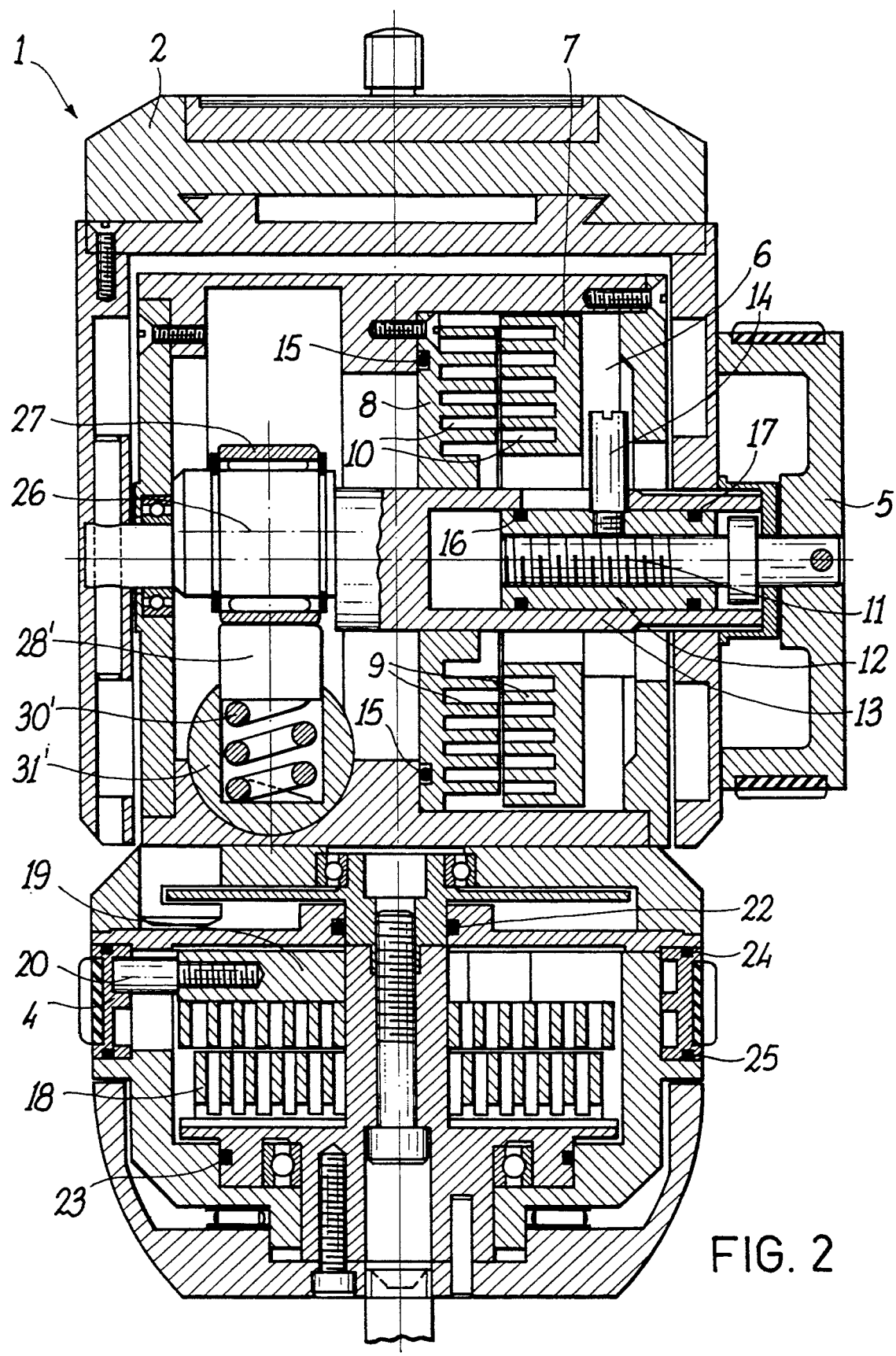
FIG. 2 is a vertical section view of the support head of FIG. 1.

FIG. 2 shows in detail the structure for effecting both the vertical and azimuthal movements. Head 1, in correspondence with the upper portion 2, contains a tight seal space 6, to be filled with the high viscosity fluid which enables actuation of the mechanism.

This latter is made up of a braked element 7 and a braking element 8 assembled on the same axis.

Each of these elements is made up of a series of concentric rings, reciprocally staggered so as to be able to interengage and defining spaces 10 inside which silicone grease is provided.

The movement of the element 7 toward the element 8 is made possible by the screw coupling 11 the rotation of which brings braked element 7 near to braking element 8, causing a hollow element 12 to slide axially inside the hollow bushing 13.

The movement of the element 12 is transmitted-to the braking element 8 by three pins 14 arranged at 120° with respect to each other along a circumference perpendicular to bushing 13 which comprises suitable slots (not shown) allowing the pins 14 to slide, causing sliding of the braking element and therefore the interengagement of the concentric rings 9.

The hollow element 12 is shifted by the operator by rotating the handle 5 in a clockwise direction to achieve increased interengagement of the surfaces and so to obtain greater resistance and, in a counterclockwise direction, to decrease the interengagement and to obtain a lower resistance.

In order to ensure oil-tightness in the tight seal space, O-ring gaskets 15 are provided in correspondence with the braked element 7 against the body 6 of the head 1, and O-ring gaskets 16, 17 along the outer surface of the hollow body 12.

With respect to horizontal movement, a braked element 18 and a braking element 19 are provided, assembled on the same axis, and also realized by means of a series of annular concentric surfaces able to interengage.

The greater or lesser engagement of the same and therefore the greater or lesser resistance which is produced are achieved by the presence of three pins 20, assembled at 120° and sliding in three-step slots provided on the drive ring nut 4.

Actuation of the ring 4 in a counterclockwise direction causes the element 19 to descend in the element 18, while actuation in a clockwise direction causes it to disengage.

Here, too, the entire mechanism is immersed in a high viscosity silicone oil bath, and O-ring gaskets 22, 23, 24 and 25 are provided to ensure oiltightness.

Figure 3:
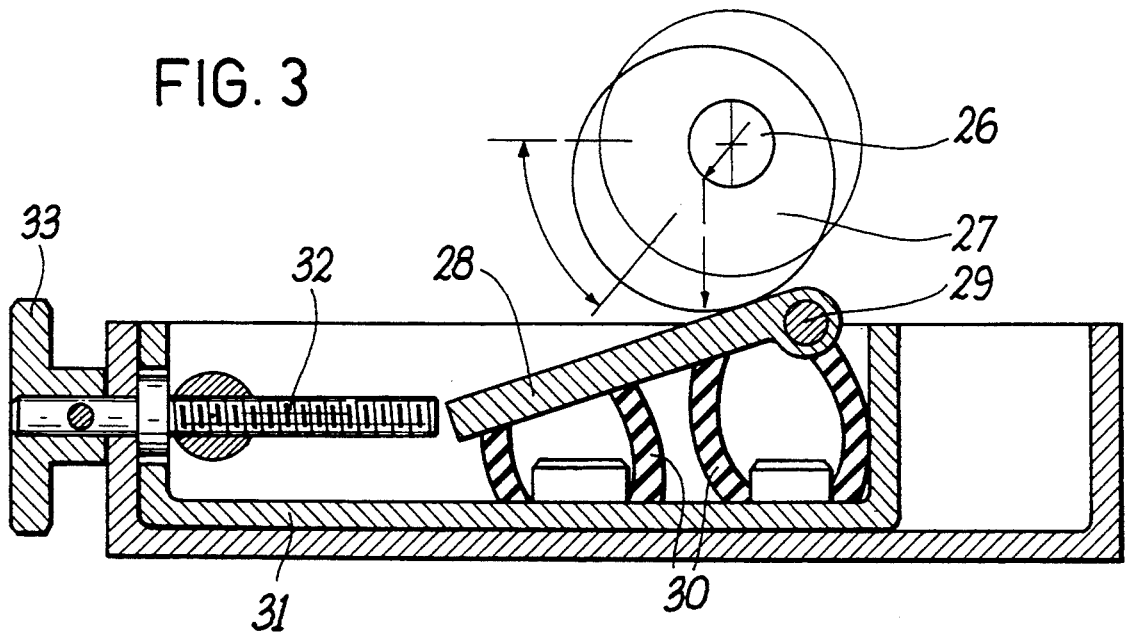
FIG. 3 is a vertical section schematic view of the balancing system with hard rubber block elastic means in the position of maximum reaction power.

As regards the counterbalancing mechanism, which in the embodiment shown herein has, as elastic means, a helical spring 30', and which is shown in enlarged and detailed view in FIG. 3 as an alternative elastic means, it is observed that on the eccentric section of the horizontal axis 26 of the head 1 a roller bearing 27 is assembled.

The axis 26 can rotated forward and rearward through 90°.

The bearing 27 in rest position is at its maximum height and will displace itself downward when the axis of the support head moves in a clockwise or counterclockwise direction.

In fact, the downward displacement of the bearing 27 determines a pressure on the arm element 28, rotating with respect to the hinge 29.

Figure 4:
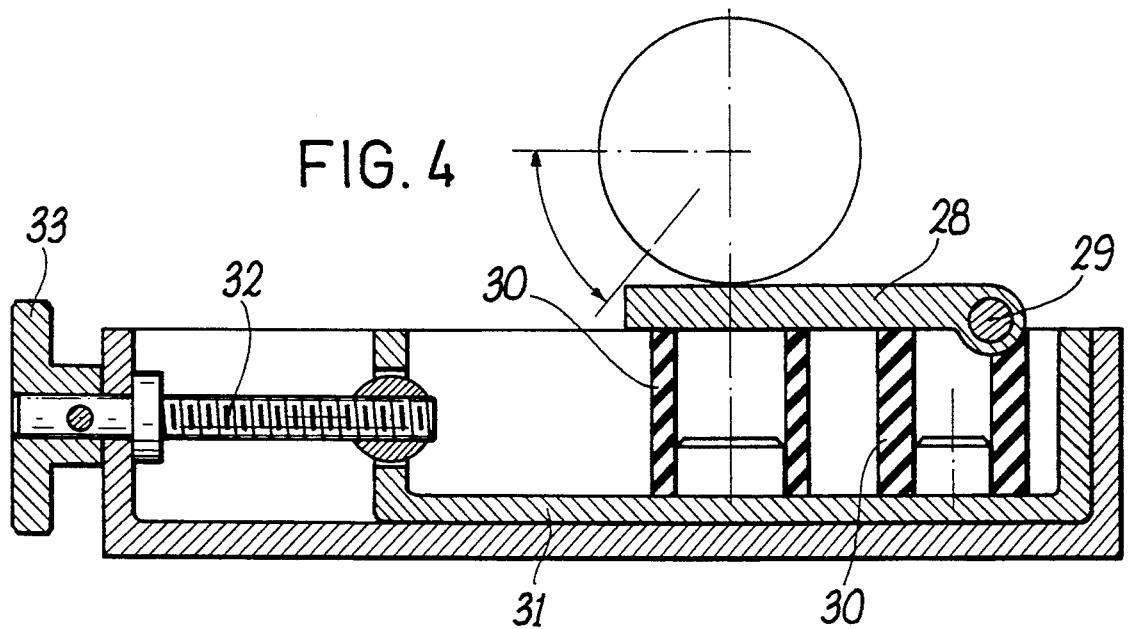
FIG. 4 shows the balancing system in rest position corresponding to a television/motion-picture camera in horizontal position.

The body of arm 28 is supported by an elastic member 30, which counterbalances the thrust of the bearing 27 on arm 28, which in the embodiment shown in FIGS. 3 and 4 is made up of hard rubber block elastic means, very resistant to crushing, while in the embodiment of FIG. 2 it is made up of the body 28' supported by the spiral spring 30' contained inside a box element 31'.

Therefore, to obtain a variable reaction, it is suggested to shift the box element 31 upon which the arm element 28 supported by the reaction elastic body along its own axis is assembled. By changing the position of the arm 28, the moment with respect to the point 29 changes as a consequence, so that the greater distance between the bearing 27 on the element 28, the less the force of reaction which is produced, while the less the distance between the point of contact of the bearing and the hinge 29, the greater the force of reaction.

The shift of the box member 31 along its own axis is achieved by means of the screw element 32 actuated by the handle 33, preferably adjusted in the position in which the television camera is horizontal.

In FIG. 4, the balancing system is illustrated in its rest position (television or motion picture camera in horizontal position) with the point of contact between the arm element 28 and the eccentric 26 at the upper maximum distance.

I claim:

1. A support head for television or motion-picture cameras adapted to perform horizontal and azimuthal panning shots, and comprising a balancing member and devices for controlling and adjusting horizontal and azimuthal movements, respectively, said device for controlling and adjusting azimuthal movement including a first braking element, and a first braked element assembled on a same axis and each comprising a plurality of concentric rings staggered so as to define spaces therebetween, the concentric rings of said first braking element engaging in the spaces defined between adjacent concentric rings of said first braked element;

a high viscosity fluid being provided in said spaces between said concentric rings of said first braking element and said first braked element, said high viscosity fluid being contained in a tight seal space inside said support head;

screw control means for actuating said first braking element arranged outside said support head, and rotating inside a longitudinally slidable hollow shaft element having on its outer surface slots receiving axially slidable first radial pin means, said first pin means engaging with an outer surface of said first braking element and further comprising adjusting means for interengagement of a second braking element and a second braked element for control of horizontal movement, said adjusting means being constituted by second pin means slidable in slots provided on a drive ring nut, wherein said support head comprises a balancing member constituted by bearing means assembled on an eccentric section of a horizontal axis of said support head, elastic means, and hinge contact means between said elastic means and said bearing means, said elastic means being assembled on a longitudinally slidable support element comprising means for causing and controlling displacement of said support element along its own axis.

2. The support head according to claim 1, wherein said elastic element of said balancing member consists of steel springs.

3. The support head according to claim 1, wherein said elastic element of said balancing member consists of a hard rubber block.

4. The support head according to claim 1, wherein said slidable support element which supports said hinge contact means is adjusted, through said means for controlling and putting into motion, by screw means arranged on an outer portion of said support.

5. The support head according to claim 1, wherein said first pin means are arranged at 120° with respect to each other.

6. The support head according to claim 1, wherein said second pin means are arranged at 120° with respect to each other.

* * * * *

UNITED STATES PATENT AND TRADEMARK OFFICE
CERTIFICATE OF CORRECTION

PATENT NO. : 5,389,972
DATED : February 14, 1995
INVENTOR(S) : Guido Cartoni

It is certified that error appears in the above-indentified patent and that said Letters Patent is hereby corrected as shown below:

On the title page, item [73], Assignee, delete

```
Sachtler
Aktiengesellschaft-Kommunikation-
stechnik, Untersch Leissheim,
Germany".
```

Signed and Sealed this

Thirty-first Day of October 1995

Attest:

BRUCE LEHMAN

*Attesting Officer*  *Commissioner of Patents and Trademarks*